United States Patent [19]

Okayama et al.

[11] Patent Number: 5,481,422
[45] Date of Patent: Jan. 2, 1996

[54] MAGNETIC HEAD WITH METALLIC MAGNETIC FILM AND PROTECTIVE FILM MEANS

[75] Inventors: Hiroshi Okayama, Kumamoto; Kazuhiro Ishibashi, Fukuoka, both of Japan

[73] Assignee: Matsushita Electric Industrial Co., Ltd., Osaka, Japan

[21] Appl. No.: 89,524

[22] Filed: Jul. 21, 1993

[30] Foreign Application Priority Data

Jul. 24, 1992 [JP] Japan ................... 4-198113

[51] Int. Cl.⁶ .................................. G11B 5/127
[52] U.S. Cl. .................................. 360/120
[58] Field of Search ............. 360/120, 126, 360/119, 125, 123

[56] References Cited

U.S. PATENT DOCUMENTS

| | | | |
|---|---|---|---|
| 4,231,816 | 11/1980 | Cuomo et al. | 148/31.55 |
| 4,368,496 | 1/1983 | Kato et al. | 360/120 |
| 4,392,167 | 7/1983 | Joormann | 360/120 |
| 4,600,957 | 7/1986 | Damen et al. | 360/120 |
| 4,803,338 | 2/1989 | Kumasaka et al. | 360/122 |
| 5,084,795 | 1/1992 | Sakatima et al. | 360/120 |
| 5,117,321 | 5/1992 | Nakanishi et al. | 360/120 |
| 5,262,915 | 11/1993 | Terunume et al. | 360/120 |

FOREIGN PATENT DOCUMENTS

| | | |
|---|---|---|
| 54-94428 | 7/1979 | Japan . |
| 64-7305 | 1/1989 | Japan . |
| 1185810 | 7/1989 | Japan . |

*Primary Examiner*—Robert S. Tupper
*Assistant Examiner*—Brian E. Miller
*Attorney, Agent, or Firm*—Pollock, Vande Sande & Priddy

[57] ABSTRACT

A magnetic head comprising first and second core halves made of an oxide magnetic material and arranged to be abutted against each other to have a winding channel and to define at least one magnetic gap therebetween and joined by a bonding glass. On each of the surfaces of the first and second core halves which respectively face said magnetic gap, there is provided a metallic magnetic film made of a metallic magnetic material including nitrogen. Further, a protective film is provided on each of the metallic magnetic films. The protective film is made of a nitride material such as CrN, VN, $Si_3N_4$, BN, TaN, AlN, TiN and ZrN. The protective films prevent the nitrogen of the metallic magnetic films from discharging into the bonding glass.

19 Claims, 8 Drawing Sheets

MAGNETIC HEAD WITH METALLIC MAGNETIC FILM AND PROTECTIVE FILM MEANS

BACKGROUND OF THE INVENTION

The present invention relates to a magnetic head to be used in connection with a recording medium having a large coercive force such as a metal tape, and more particularly to a so-called metal-in-gap (MIG) type magnetic head whose magnetic core comprises a ferrite core having a high magnetic permeability and a metallic magnetic film having a high saturation magnetic flux density.

Recently, in the magnetic recording art for use in computer systems, a so-called MIG type magnetic head equipped with a ferromagnetic metallic film having a high saturation magnetic flux density is proposed and put into practical use in connection with heightening the recording density and frequency of the information signal. A conventional MIG type magnetic head will be described hereinbelow with reference to FIG. 12.

In FIG. 12, the conventional MIG type magnetic head basically comprises high magnetic permeability ferrite cores 1 taking an opposed relation to each other and metallic magnetic films 2 including nitrogen, having a high saturation magnetic flux density and disposed at the insides of the ferrite cores 1 to take an opposed relation to each other. Between the metallic magnetic films 2 there are provided SiO2 films 4 which are in turn joined through a PbO based low-melting-point glass film (junction film) 5 to each other. This junction film 5 and the SiO2 films 4 make up a magnetic gap. Numeral 6 designates a bonding glass.

In the case of a thin film medium having Hc<1500 (Oe), the metallic magnetic film 2 made of an Fe-Al-Si based alloy (Sendust alloy), Co based amolphous alloy or others which has a high saturation magnetic flux density of about 10 KG is put into practical use. On the other hand, in the case of a thin film medium having Hc≧1500 (Oe), the recording and reproduction of an information signal cannot sufficiently be affected with such a metallic magnetic film of about 10 KG. Thus, the metallic magnetic film is required to have a higher saturation magnetic flux density.

One possible solution is to use a metallic magnetic film made of an Fe-metal-N based material as described in the Japanese Patent provisional Publication No. 54-94428. In a MIG type magnetic head using a metallic magnetic film made of the Fe-metal-N based material (metal denotes at least one of metallic elements belonging to the IVa group, Va group, VIa group in the periodic table), for improving the soft magnetic characteristic of the Fe-metal-N based alloy, the junction between the ferrite core halves is made at a temperature of about 500° to 600° C. This thermal junction is also for the thermal treatment. However, in the aforementioned conventional arrangement, when constructing the MIG type magnetic head with the Fe-metal-N based alloy by melting and adhesion, there is a problem that the nitrogen of the Fe-metal-N based alloy film is bubbled in the bonding glass 6 (close to the metallic magnetic film 2) by the heating as shown in FIG. 13. Concurrently with making its appearance worse, the bubbles 100 lower the strength of the glass itself whereby many cracks occur in manufacturing to deteriorate the yield of the products. According to an analysis, the nitrogen also exists between the metallic magnetic film 2 and the SiO2 film 4. It is considered from this that the nitrogen from the metallic magnetic film 2 due to the thermal treatment flows into the bonding glass 6 along the SiO2 film 4 to generate the bubbles 100 therein. Or it is considered as the nitrogen flows from an area 102 (FIG. 13) of the metallic magnetic film 2 into the bonding glass 6.

The Japanese Patent provisional Publication No. 1-185810 discloses a technique to remove bubbles existing in a glass through metallic films additionally provided on metallic magnetic films. However, the metallic magnetic films do not include nitrogen and the metallic films are not arranged to prevent the nitrogen of the metallic magnetic films from flowing into the glass to generate bubbles therein when performing the thermal treatment.

SUMMARY OF THE INVENTION

It is therefore an object of the present invention to an MIG type magnetic head which is capable of preventing the generation of bubbles due to nitrogen of a metallic magnetic film in a bonding glass to improve its durability simultaneously with having a high recording and reproduction characteristic with respect to a thin film medium having Hc≧1500 (Oe), and which is capable of having a high yield to be suitable for mass production.

According to this invention, there is provided a magnetic head comprising first and second core halves made of an oxide magnetic material and abutted against each other to define at least one magnetic gap therebetween and joined by a bonding glass. On each of the surfaces of the first and second core halves which respectively face said magnetic gap, there is provided a metallic magnetic film made of a metallic magnetic material including nitrogen. Further, a protective film is provided on each of the metallic magnetic films. The protective film is made of a nitride material such as CrN, VN, Si3N4, BN, TaN, AlN, TiN and ZrN. The protective films can prevent the nitrogen of the metallic magnetic films from discharging into the bonding glass.

BRIEF DESCRIPTION OF THE DRAWINGS

The object and features of the present invention will become more readily apparent from the following detailed description of the preferred embodiments taken in conjunction with the accompanying drawings in which.

DETAILED DESCRIPTION OF THE INVENTION

Figure 1:
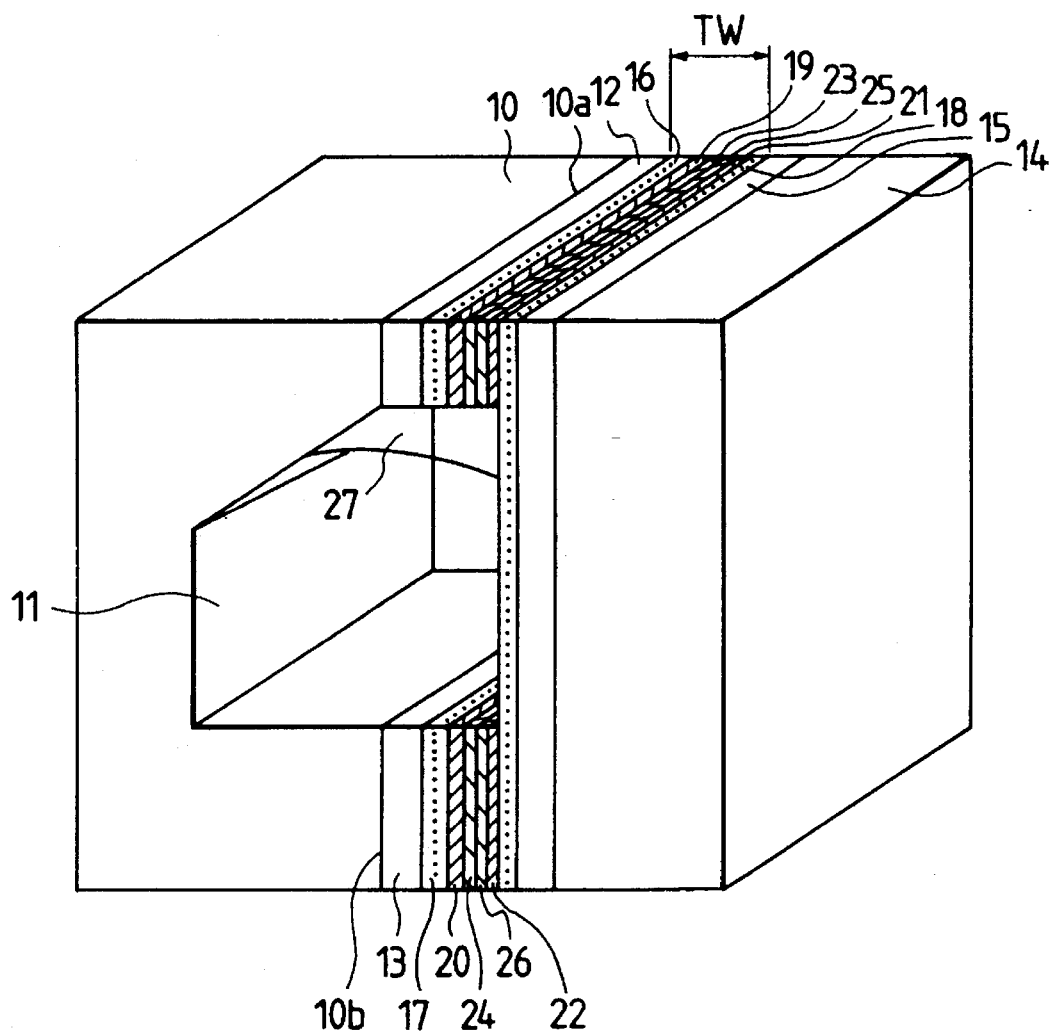
FIG. 1 is a perspective view showing an arrangement of a magnetic head according to an embodiment of the present invention.

Referring now to FIG. 1, a description will be made hereinbelow in terms of a magnetic head according to an embodiment of the present invention. In FIG. 10, the magnetic head comprises a C-shaped core half 10 made of an oxide magnetic material such as a Mn-Zn ferrite and an I-shaped core half 14 similarly made of an oxide magnetic material such as a Mn-Zn ferrite. The C-shaped core half has a channel 11 for a winding. The C-shaped core half 10 and the I-shaped core half 14 are abutted against each other so as to form a front gap and a back gap therebetween. Also included in the magnetic head are metallic magnetic films 12, 13 and 15 made of magnetic materials each including nitrogen. The metallic magnetic film 12 is disposed on a surface 10a of the C-shaped core half 10 which faces the front gap, the metallic magnetic film 13 is placed on a surface 10b of the same C-shaped core half 10 which faces the back gap, and the metallic magnetic film 15 is provided on a surface of the I-shaped core half 14 which faces the front and back gaps. That is, the metallic magnetic film 15 takes the opposed relation to the other metallic magnetic films 12 and 13. These metallic magnetic films 12, 13 and 15 are respectively made of a nitrogen-containing metallic magnetic material (Bs≧1.5T) such as an Fe-metal-N based alloy (metal: at least one of metallic elements belonging to the IVa group, Va group, VIa group in the periodic table, more specifically at least one of metals such as Nb, Zr, Ti, Ta, Hf, W and Mo in chemical symbol). When Fex (Metal)y Nz, the composition of the aforementioned material is generally as follows:

75≦x–94  6≦y<25  0.1≦z≦20 (atom %)

More specifically, the composition is Fe100-x-y-z Tax Zry Nz (the unit of x, y, z is atom %, and 2≦x≦8, 2≦y≦ 8, 5≦ z≦15).

Here, although in this embodiment a Fe based material is used as the metallic magnetic material, it is appropriate to use a Co based nitrogen-containing magnetic material. Further, depending upon conditions in use, the thicknesses of the metallic magnetic films 12, 13 and 15 are respectively set to be about 0.5 to 5 μm. The typical formation technique for the metallic magnetic films 12, 13 and 15 is the sputtering method. In the case of forming them in accordance with the sputtering method, a predetermined amount of nitrogen gas is mixed in the sputter gas and the metallic magnetic films 12, 13 and 15 are formed by sputtering the pellet which is the component of the metallic magnetic films.

Moreover, on the metallic magnetic films 12, 13 and 15 there are provided protective films 16, 17 and 18 each having a thickness above 10 nm and being made of CrN, VN, Si3N4, BN, TaN, AlN, TiN, ZrN or others. These protective films 16 to 18 can be formed in accordance with a thin-film formation technique such as the sputtering method. For example, if using the Cr target, a nitrogen gas is mixed in the sputter gas (Ar+ N2), then performing the sputtering (reactive sputtering method) to form a protective film (CrN film). Further, on the protective films 16 and 17, SiO2 films 19 and 20 are respectively formed in accordance with a thin-film formation technique such as the sputtering method, and on portions of the protective film 18 which respectively faces the front gap and back gap (the aforementioned SiO2 films 19 and 20), SiO2 films 21 and 22 (made of a non-magnetic material) are formed in accordance with a thin-film formation technique or the like. In addition, adhesive glasses (non-magnetic materials) 23, 24, 25 and 26 are provided on the SiO2 films 19, 20, 21 and 22, respectively. The adhesive glasses 23 and 25 are joined to each other to achieve the connection between the front gap portions of the C-shaped core half 10 and the I-shaped core half 14, and the adhesive glasses 24 and 26 are joined to each other to perform the connection between the back gap portions of the C-shaped core half 10 and the I-shaped core half 14. For example, the adhesive glasses 23 to 26 are made of an SiO2-B2O3-Al2O3-Na2O based glass material. In the case of using this glass material as the adhesive glass material, it is preferable that the thickness of the adhesive glass is above 0.1 μm. This 0.1 μm thickness is a thickness of one adhesive glass (for example, the adhesive glass 23) formed as a single layer. It is also appropriate that the adhesive glasses 23 to 26 are made of a Pb-Al2O3-B2O3-Si2O based glass material. In the case of using this glass material, the thickness of each adhesive glass is preferable to be above 0.06 μm.

Numeral 27 denotes a bonding glass whereby the C-shaped core half 10 is joined to the I-shaped core half 14. The bonding glass 27 is made of an SiO2-PbO-Li2O-K2O-Na2O-K2O-Al2O3-ZnO based glass material. The bonding glass 27 is provided at the front gap side of the winding channel 11 between the core halves 10 and 14.

In the magnetic head thus arranged, the width of the optical magnetic gap becomes TW as indicated in FIG. 1. That is, for example, the distance between the metallic magnetic films 12 and 15 acts as the gap width TW.

Here, although in this embodiment the oxide film constituting the magnetic gap has a two-layer structure (SiO2 film+ adhesive glass), it is appropriate that it has a one-layer structure. In this case, it is preferable that as well as the bonding glass 27, the oxide film is made of of an SiO2-PbO-Li2O-K2O-Na2O-K2O-Al2O3-ZnO based glass material.

According to this embodiment, the protective films 16 to 18 on the metallic magnetic films 12, 13 and 15 can prevent nitrogen from being discharged from the metallic magnetic films 12, 13 and 15, irrespective of the thermal treatment so that no bubble forms in the bonding glass 27, thus allowing a strong connection between the core halves 10 and 14. The invention prevents nitrogen of the metallic magnetic films from flowing into the bonding glass to generate bubbles within the bonding glass when performing the thermal treatment of the magnetic head equipped with the metallic magnetic films including the nitrogen. This invention differs from the above-mentioned Japanese Patent Provisional Publication No. 1-185810 where metallic films, which react on gases to produce metallic compounds, are formed on metallic magnetic films (not including nitrogen) of a magnetic head so as to remove gases included in the glass in the thermal treatment.

Secondly, a more detailed description will be made hereinbelow in terms of the effects of forming the protective films on the metallic magnetic films. As a sample, a metallic magnetic film comprising an Fe-Ta-Zr-N film having a thickness of about 2 μm is manufactured on an Si wafer substrate using an Fe87 Ta6 Zr7 alloy target and using Ar+

Figure 2:
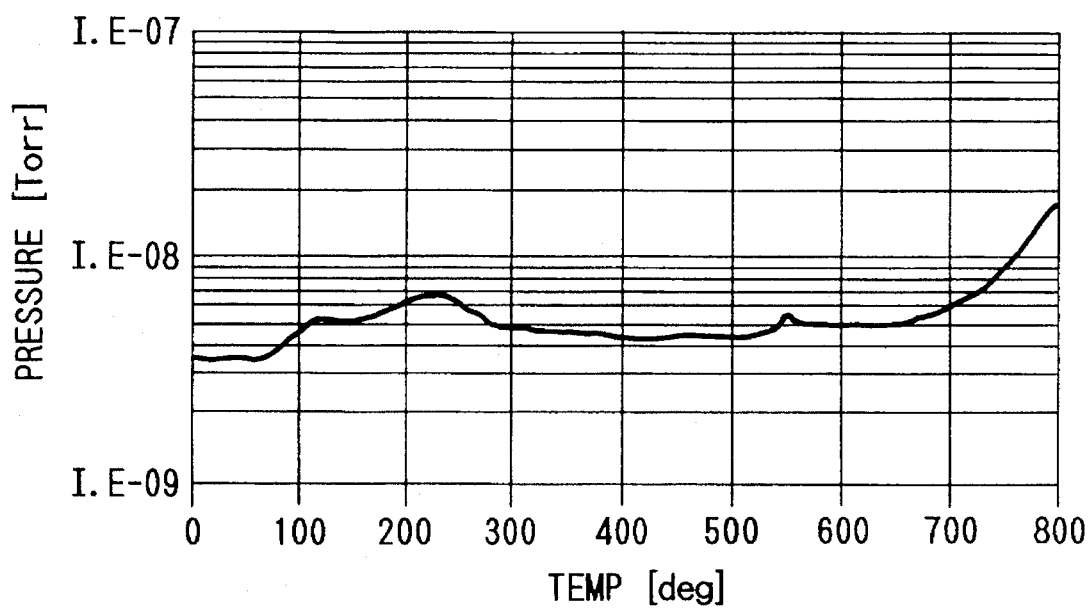
FIG. 2 shows the relation between temperature and the pressure of a supernalant gas from a metallic magnetic film at the time of increasing the temperature.
Figure 3:
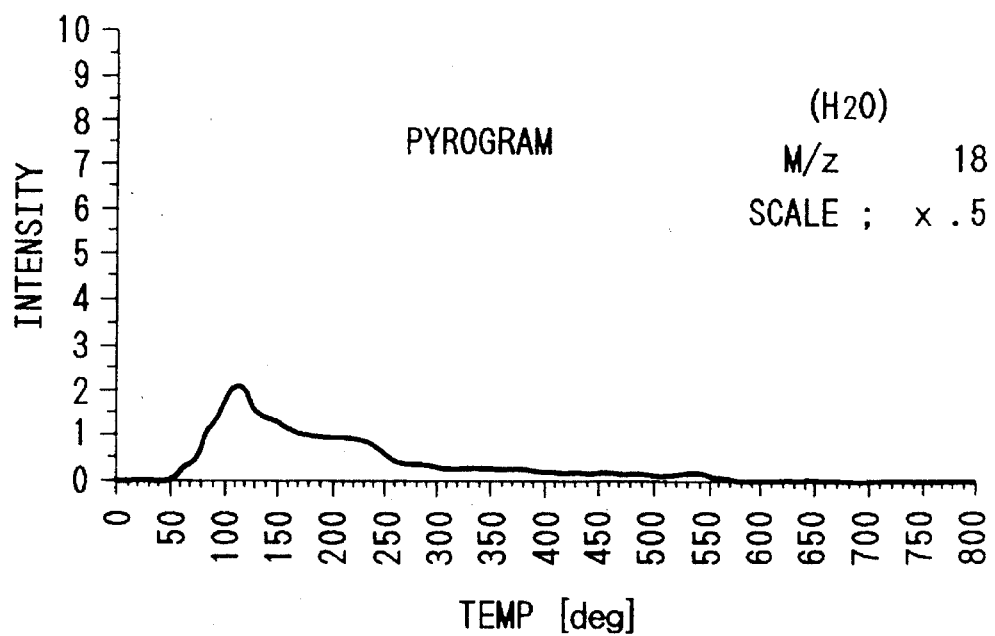
FIG. 3 shows the relation between temperature and the partial pressure of H2O gas of the supernatant gas at the time of the temperature-up.
Figure 4:
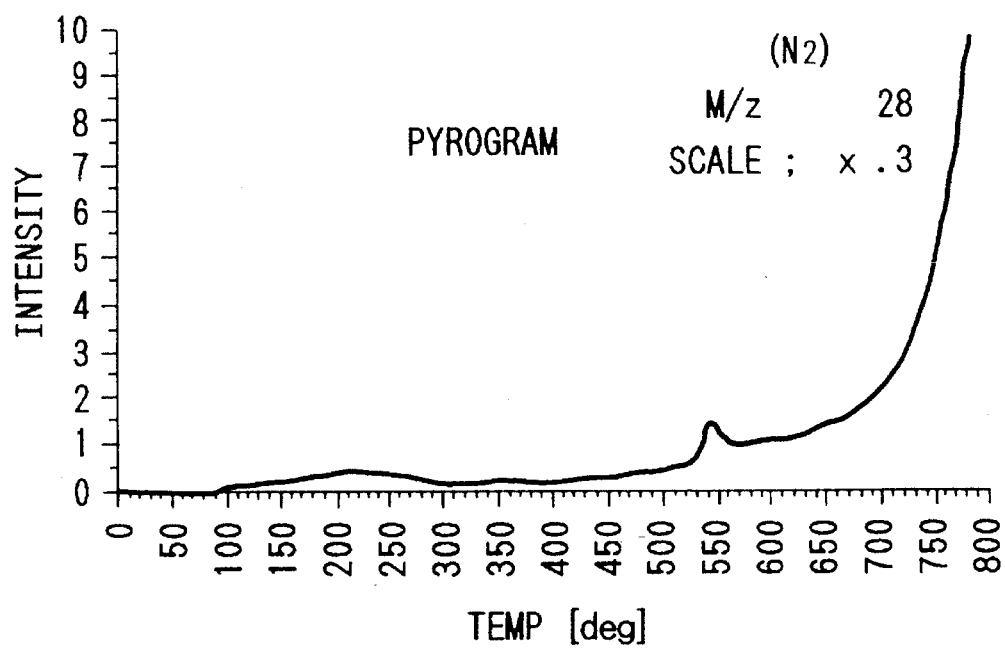
FIG. 4 shows the relation between temperature and the partial pressure of N2 gas of the supernatant gas at the time of the temperature-up.

N2 (6%) mixed gas under a total pressure 0.45 Pa of Ar+ N2 in accordance with the reactive sputtering method and a protective film comprising a CrN film having a thickness of about 40 nm is then manufactured on the Fe-Ta-Zr-N film using a Cr target and using Ar+ N2 (4%) mixed gas under a total pressure 0.5 Pa of Ar+ N2 in accordance with the reactive sputtering method. A test is made using the sample in terms of the generation state of gas from the metallic magnetic film. A high-accuracy temperature-up supernatant gas analyzing apparatus (manufactured by Denshi Kagaku Co., Ltd) is used for this test, and in the test the sample is temperature-up-heated at a high temperature under high vacuum ($10^{-9}$ Torr) so as to measure the relations of the pressure of the supernatant (desorption) gas and the partial pressures of H2O gas and H2 gas of the supernatant gas relative to the temperature. FIGS. 2 to 4 show these test results. FIG. 2 shows the relation between the temperature and the pressure of the supernatant gas from the metallic magnetic film at the time of increasing the temperature (temperature-up), FIG. 3 shows the relation between the temperature and the partial pressure of H2O gas of the supernatant gas at the time of the temperature-up, and FIG. 4 shows the relation between the temperature and the partial pressure of N2 gas of the supernatant gas at the time of the temperature-up.

Figure 5:
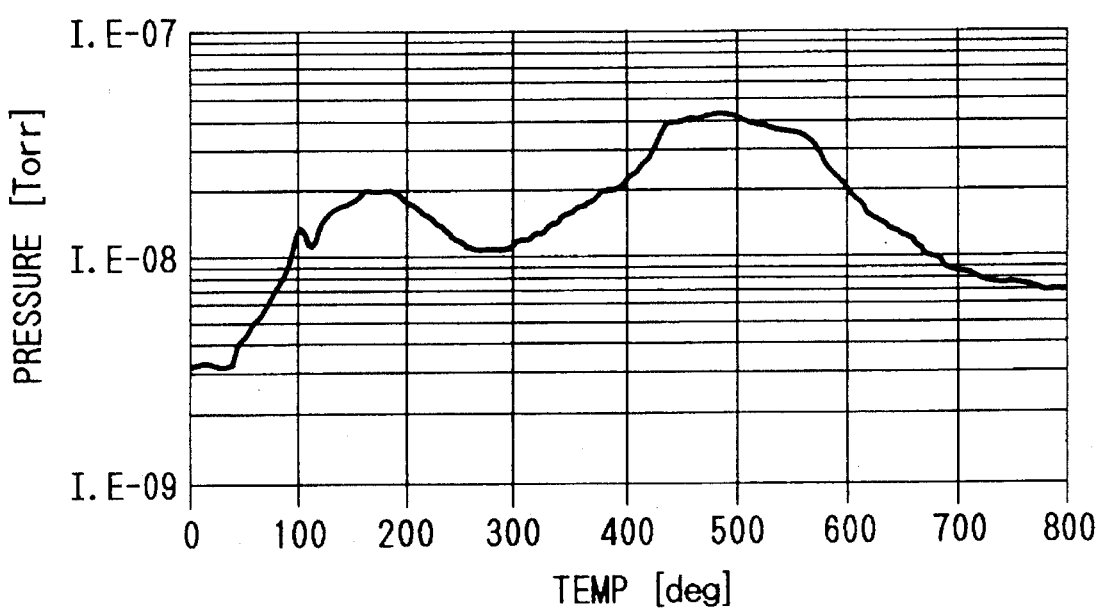
FIG. 5 shows the relation between temperature and the pressure of the supernatant gas from a metallic magnetic film at the time of the temperature-up.
Figure 6:
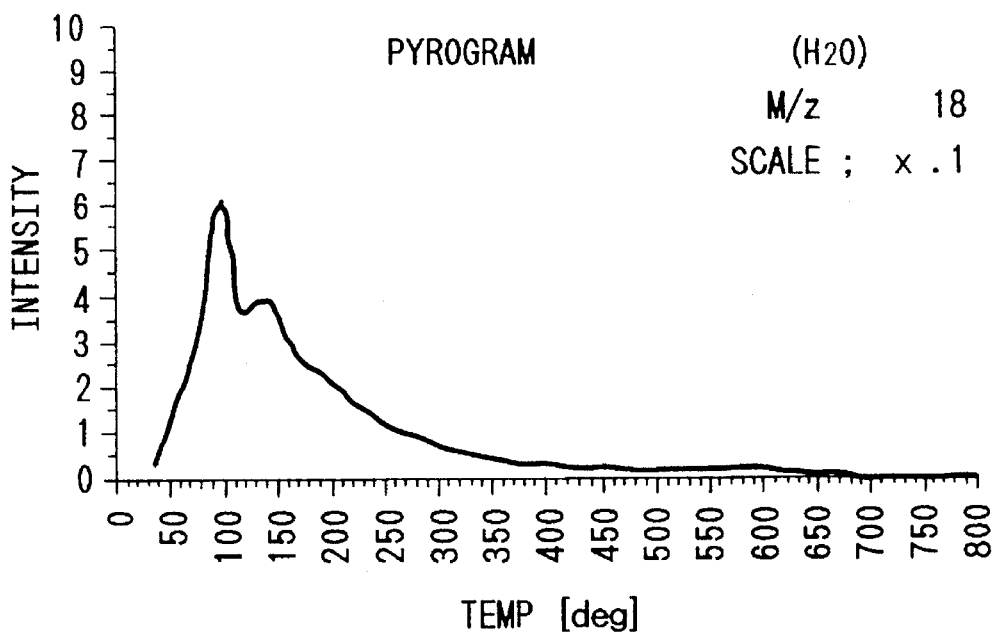
FIG. 6 shows the relation between temperature and the partial pressure of H2O gas of the supernatant gas at the time of the temperature-up.
Figure 7:
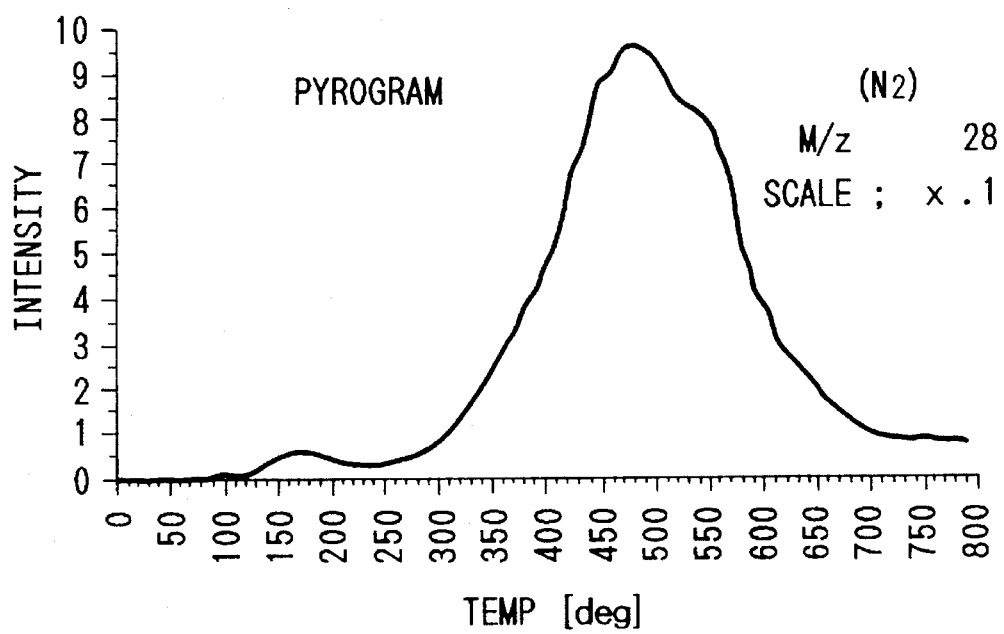
FIG. 7 shows the relation between the temperature and the partial pressure of N2 gas of the supernatant gas at the time of the temperature-up.

For the purpose of a comparison with the above-mentioned sample, a sample is manufactured in the same manner as the above-mentioned sample, but not having the protective film, yet similarly tested. These test results are shown in FIGS. 5 to 7. FIG. 5 shows the relation between the temperature and the pressure of the supernatant gas from the metallic magnetic film (sample) at the time of the temperature-up, FIG. 6 shows the relation between the temperature and the partial pressure of H2O gas of the supernatant gas at the time of the temperature-up, and FIG. 7 shows the relation between the temperature and the partial pressure of N2 gas of the supernatant gas at the time of the temperature-up.

As seen from FIGS. 2 to 4, in the case of Fe-Ta-Zr-N metallic magnetic film having on its surface the CrN protective film (this embodiment), the H2O gas generates in a temperature range of 50° to 220° C. and an extremely small amount of N2 gas generates at the vicinity of 550° C. (anneal temperature). On the other hand, in the case of the comparison sample not having the protective film, as seen from FIGS. 5 to 7, the metallic magnetic film (Fe-Ta-Zr-N film) generates the H2O gas in a temperature range of 50° to 200° C. and desorbs a large amount of N2 gas in a temperature range of 300° to 650° C. Here, it can be estimated that the H2O gas is the absorption gas after the manufacturing of the sample.

As obvious from the above-described results, the provision of the CrN protective film on the Fe-Ta-Zr-N metallic magnetic film can effectively prevent the production of the N2 gas.

Further, a magnetic head as shown in FIG. 1 is manufactured and tested to check the generation states of bubbles in the bonding glass 27. In this magnetic head, the thickness of the SiO2 film is 100 nm, the thickness of the adhesive glass is 100 nm and the adhesive glass is made of a PbO based glass material. The following table I shows the generation states of bubbles depending on the kinds of the protective film and the thickness of the protective film. This table I also shows the bubble generation states in the comparison sample.

TABLE I

| Protective Film | This Embodiment | | Comparison Sample | |
|---|---|---|---|---|
| | Thickness (nm) | Bubble | Thickness (nm) | Bubble |
| VN | 25 | Absent | 8 | Exist |
| $Si_3N_4$ | 45 | Absent | 5 | Exist |
| BN | 56 | Absent | 4 | Exist |
| TaN | 34 | Absent | 6 | Exist |
| AlN | 60 | Absent | 9 | Exist |
| TiN | 50 | Absent | 8 | Exist |
| ZrN | 24 | Absent | 4 | Exist |

As obvious from this Table I, when providing the protective film on the metallic magnetic film, the bubbles are suppressed. In the test, when the thickness of the protective film is below 10 nm, bubbles have appeared in the bonding glass in the glass melting-adhesion, while, when the thickness of the protective film is above 10 nm, bubbles are avoided. Thus, the protective film preferably has a thickness above 10 nm.

Figure 8:
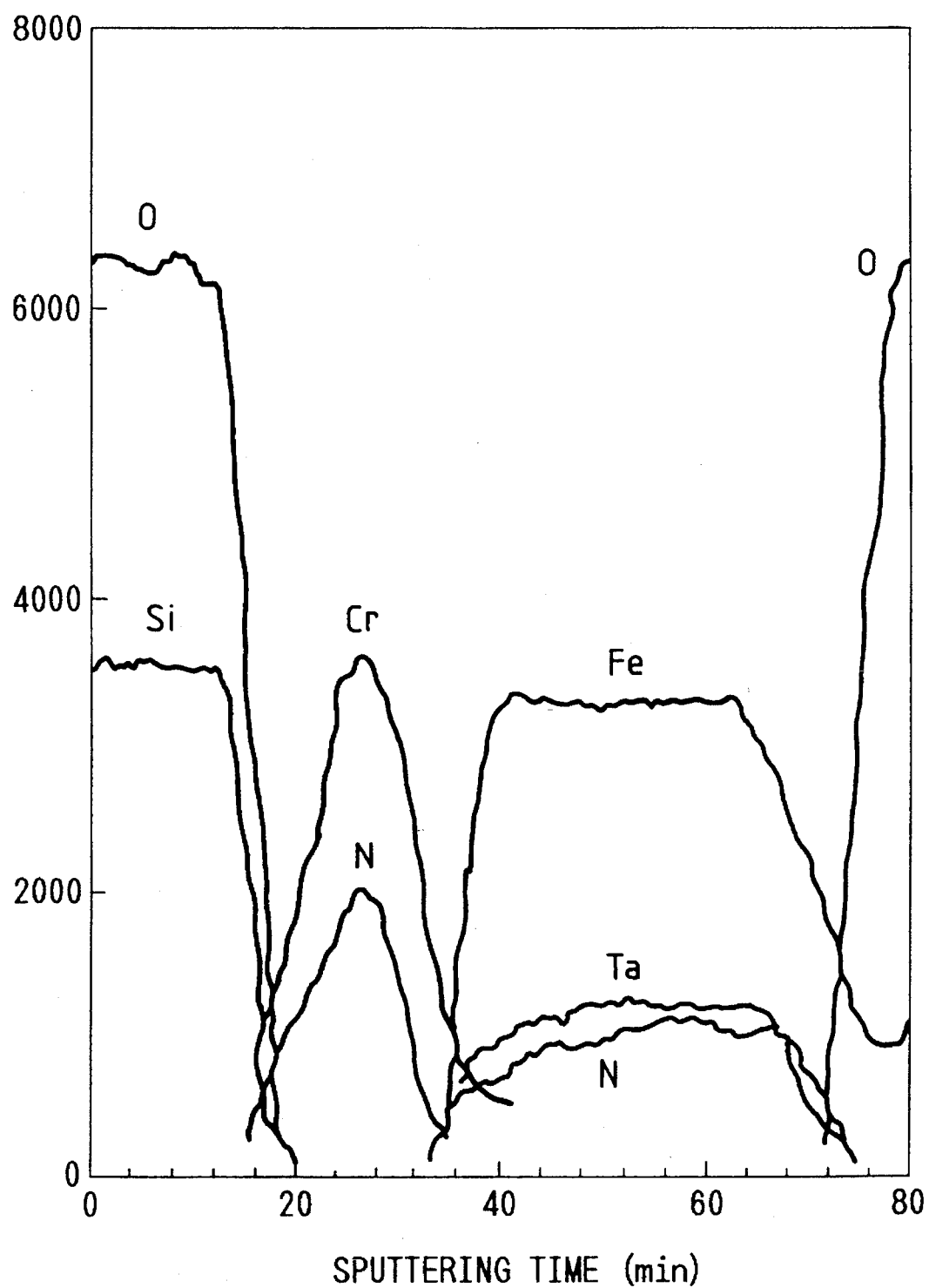
FIG. 8 shows Auger analysis data of a sample having a protective film after a thermal treatment of the sample under a nitrogen atmosphere.

Secondly, the heat-resisting property of the protective film has been tested in accordance with the Auger analysis. As a sample, a film is formed on a high magnetic permeability substrate using an Fe87 Ta6 Zr7 alloy target and using Ar+ N2 (6%) mixed gas under a total pressure 0.45 Pa of Ar+ N2 in accordance with the reactive sputtering method to have a thickness of 50 nm and a CrN film is then formed on the first-formed film using a Cr target and using Ar+N2 (4%) mixed gas in accordance with the reactive sputtering method to have a thickness of 50 nm. This sample has been Auger-analyzed after being thermal-treated for one hour at a temperature of 550° C. (annealing temperature) under a nitrogen ambient atmosphere. FIG. 8 shows this test result. As seen from FIG. 8, the metal (Cr) of the nitride (CrN) is not dispersed to the metallic magnetic nitride alloy film. Thus, the protective film is stable against heat at the annealing time.

Figure 9:
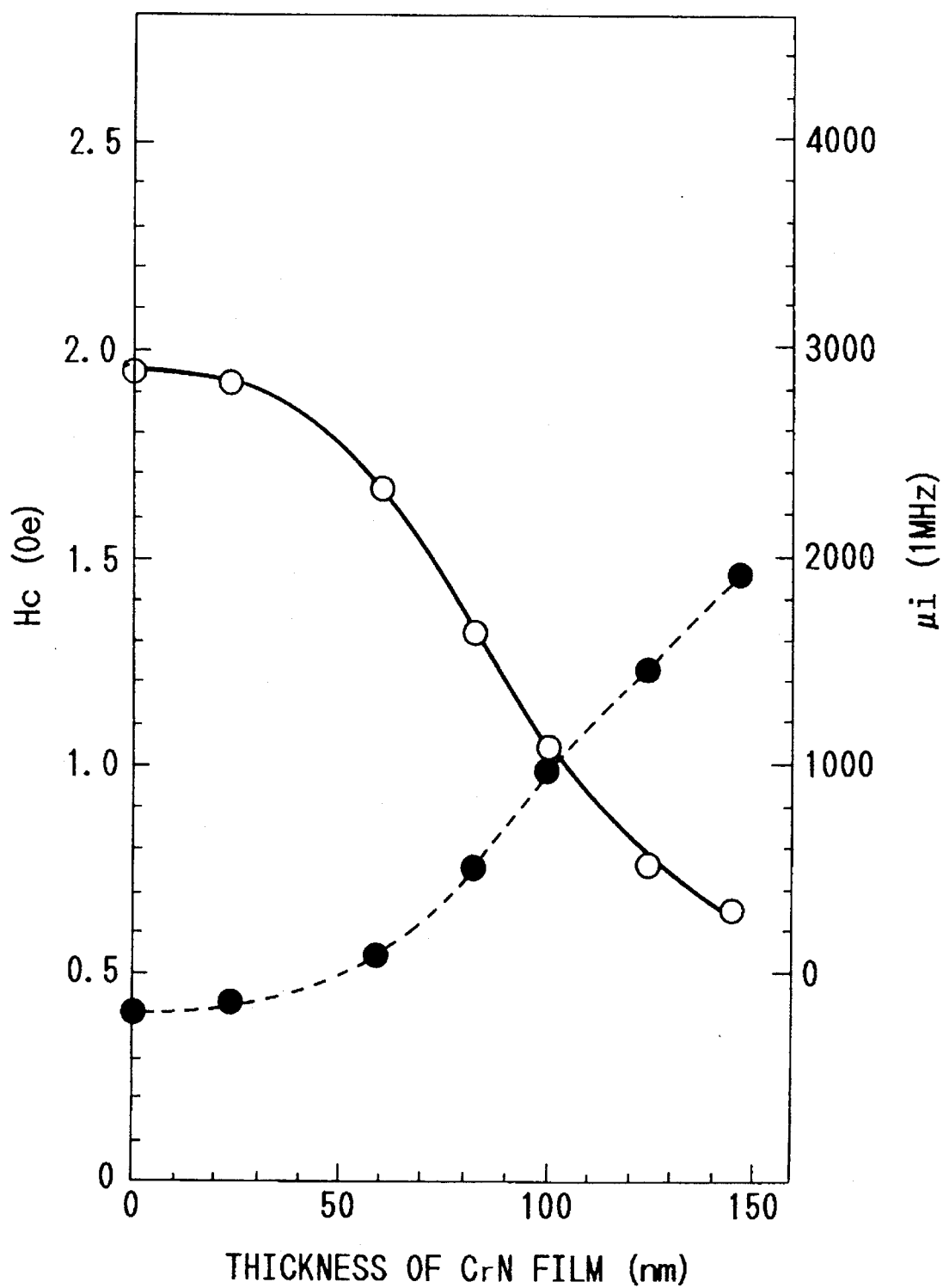
FIG. 9 shows a soft magnetic characteristic of a sample having a protective film.

Further, the soft magnetic characteristics of the protective film in different thicknesses have been tested. As samples, a metallic magnetic film having a thickness of 2 μm is formed on a cystallized glass substrate (PEG3110C substrate having a linear thermal expansion coefficient of $110 \times 10^{-7}$/°C., manufactured by HOYA Co., Ltd) using an Fe87 Ta6 Zr7 alloy target and using Ar+ N2 (6%) mixed gas under a total pressure 0.45 Pa of Ar+ N2 in accordance with the reactive sputtering method and a CrN film is then formed on the metallic magnetic film using a Cr target and using Ar+ N2 (4%) mixed gas under a total pressure 0.5 Pa of Ar+ N2 in accordance with the reactive sputtering method. These formations of the metallic magnetic film and the CrN film are effected several times so as to manufacture a plurality of samples different in thickness of the CrN films from each other. The thicknesses of the CrN films are 0, 50, 75, 100 125 and 150 nm. FIG. 9 shows the measurement results of Hc and μi (i MHz) of these samples. From FIG. 9, when the thickness of the CrN protective film is below 100 nm, it is seen that Hc≦1 (oersted) and μ (1 MHz)≧ 1000. Thus, from the viewpoint of the soft magnetic characteristic, it is preferable that the thickness of the protective film is above 10 nm and below 100 nm (10 nm ≦thickness≦100 nm).

Here, a sample having a thickness of about 2 μm is formed on a cystallized glass substrate of 10 mm×10 mm×1 mmt (manufactured by HOYA Co., Lid) using an Fe87 Ta6 Zr7 alloy target and using Ar+ N2 (6%) mixed gas in accordance with the reactive sputtering method and thermal-treated for one hour at a temperature of 550° C. under a nitrogen atmosphere, before measuring Bs using a vibration sample type magnetometer (VSM). At this time, the measurement result is Bs=1.6T.

As described above, according to this embodiment, since the nitride protective film is provided on the metallic magnetic film so as to prevent the discharge of nitrogen from the metallic magnetic film, it is possible to prevent the generation of bubbles in the bonding glass in the thermal treatment, thereby preventing the deterioration of the junction strength and others. In addition, as obvious from the above-described tests, when setting the thickness of the protective film to 10 nm to 100 nm, it is possible to provide an excellent soft magnetic characteristic and others. Here, the thickness of the protective film is more preferable to be 40 nm to 100 nm. In the practical use, although depending upon the specification of the magnetic head and others, the thickness of the protective film may be set to be 10 nm to 200 nm.

Figure 10A:
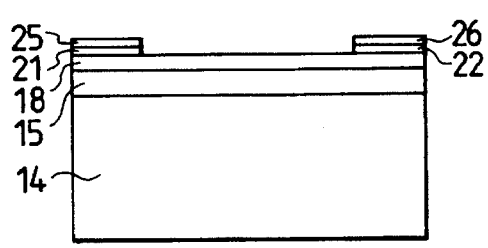
FIGS. 10A and 10B are illustrations for describing a manufacturing method of a magnetic head according to the embodiment of this invention.
Figure 10B:
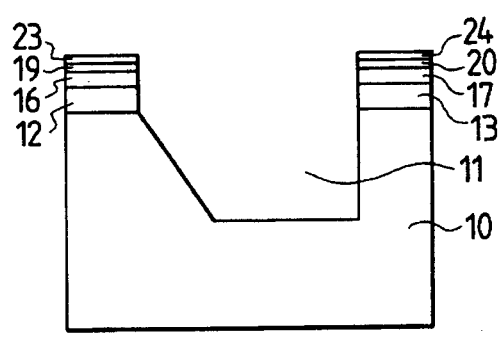

A description will be made hereinbelow in terms of a method of manufacturing the magnetic head according to this embodiment. First, magnetic blocks, made of an oxide material such as a ferrite, are machined to manufacture the C-shaped core half 10 and I-shaped core half 14 as illustrated in FIGS. 10B and 10A. At this time, the winding channel 11 having a trapezoidal configuration is formed in the C-shaped core half 10. Secondly, the mirror surface process is effected with respect to the gap-facing surfaces of the core halves 10 and 14 and the metallic magnetic films 12, 13 and 15 are formed on the gap-facing surfaces thereof. As described above, the metallic magnetic films 12, 13 and 15 are respectively formed in accordance with the sputtering method. Then, the protective films 15 to 18 are formed on the metallic magnetic films 12, 13 and 15, respectively. Further, the SiO2 films 19 and 20 are respectively formed on the protective films 16 and 17, and the SiO2 films 21 and 22 are formed on the portions of the protective film 18 which face the front gap and back gap, respectively. Thereafter, the adhesive glasses 23 to 26 are provided on the SiO2 films 19 to 22, respectively. After the provision of the adhesive glasses 23 to 26, the C-shaped core half 10 and the I-shaped core half 14 are abutted against each other so that the adhesive glasses 23 and 25 are in opposed relation to each other and the adhesive glasses 24 and 26 are also in opposed relation to each other, and a bar glass is placed in the winding channel 11 and at the vicinity of the front gap. In this state, the thermal treatment is effected with respect to the core halves 10 and 14, abutted against each other, so as to soften the adhesive glasses for connections therebetween and to soften the bar glass as the bonding glass. At this time, although in the case of the conventional head the nitrogen gas from the metallic magnetic films 12, 13 and 15 is introduced into the bonding glass to generate bubbles, in this embodiment the discharge of the nitrogen therefrom is prevented by the nitride protective films 16 to 18 so as to prevent the generation of the bubbles in the bonding glass. Finally, the medium-facing surface of the core assembly thus arranged is mirror-processed, thereby obtaining the magnetic head as illustrated in FIG. 1.

Figure 11:
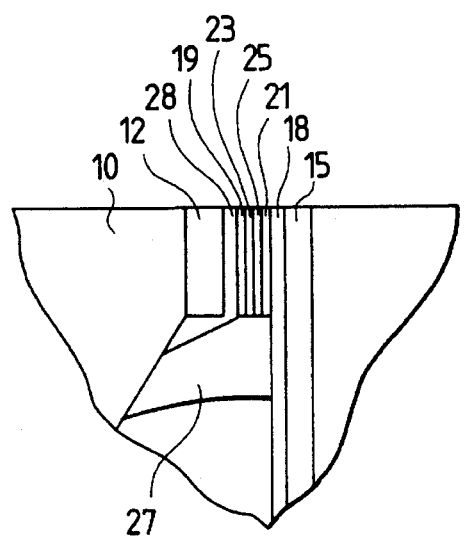
FIG. 11 shows a modification of the embodiment of this invention.
Figure 12:
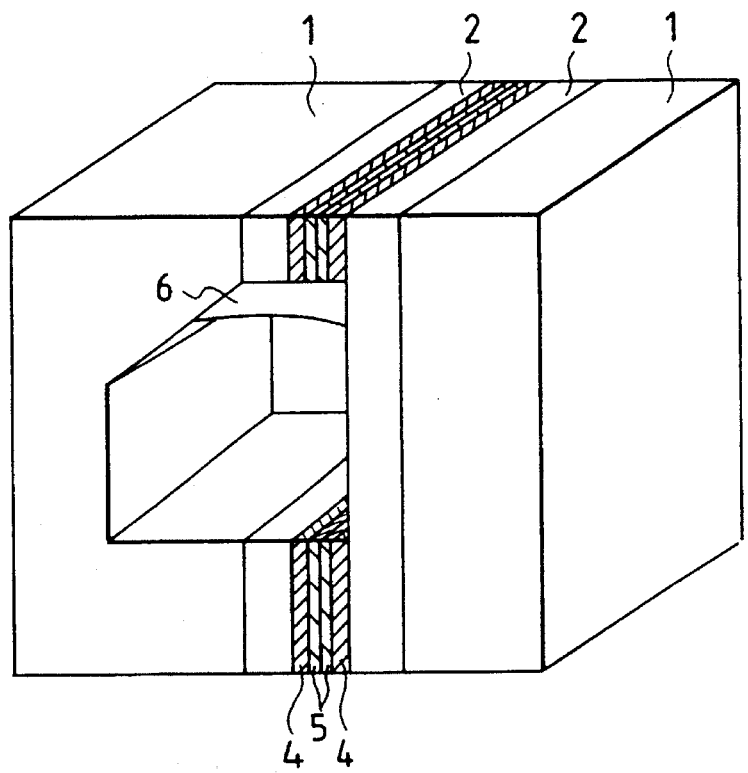
FIG. 12 is a perspective view showing an arrangement of a conventional magnetic head.
Figure 13:
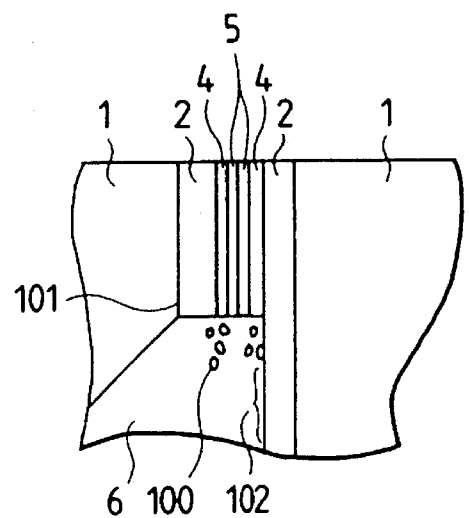
FIG. 13 is an enlarged view showing a portion of the conventional magnetic head.

In this embodiment, it is appropriate that as illustrated in FIG. 11, a protective film be provided between the metallic magnetic film 12 and the bonding glass 27 so as to prevent the direct contact therebetween. Further, it is possible that only the metallic magnetic film provided with respect to one of both the core halves is arranged to include the nitrogen.

It should be understood that the foregoing relates to only preferred embodiments of the present invention, and that it is intended to cover all changes and modifications of the embodiments of the invention herein used for the purposes of the disclosure, which do not constitute departures from the spirit and scope of the invention.

What is claimed is:

1. A magnetic head comprising first and second core halves made of a magnetic material and defining a magnetic gap therebetween, a metallic magnetic film including nitrogen in contact with each of surfaces of said first and second core halves which respectively face said magnetic gap, and a protective film means in contact with each of said metallic magnetic films to prevent said nitrogen of said metallic magnetic films from being discharged, said first and second core halves having said metallic magnetic films and said protective film means on the gap-facing surfaces thereof being abutted against and joined to each other through a non-magnetic film provided between said protective films so that said metallic magnetic films are in opposed relation to each other with said protective films and said non-magnetic film being interposed therebetween, and a bonding glass for fastening said first and second core halves, said bonding glass remaining free of nitrogen bubbles due to said protective film means located between said bonding glass and said metallic magnetic film.

2. A magnetic head as claimed in-claim 1, wherein each of said metallic magnetic films is made of an Fe-metal-N based alloy having a metal at least one of metallic elements belonging to a IVa group, Va group or VIa group in the periodic table.

3. A magnetic head as claimed in claim 2, wherein said metal of said Fe-metal-N based alloy is at least one selected from Nb, Zr, Ti, Ta, Hf, W and Mo.

4. A magnetic head as claimed in claim 1, wherein each of said protective film means is made of a nitride material.

5. A magnetic head as claimed in claim 4, wherein said protective film means is made of at least one selected from CrN, VN, Si3N4, BN, TaN, AlN, TiN and ZrN.

6. A magnetic head as claimed in claim 1, wherein each of said protective film means is arranged to have a thickness of 10 nm to 100 nm.

7. A magnetic head comprising:

first and second core halves made of a ferrite, said first core half having a winding channel so as to form a C-shaped configuration and said second core half having an I-shaped configuration, said first and second core halves defining at least one magnetic gap therebetween upon being abutted against each other;

first and second metallic magnetic films at least one of which is made of metallic magnetic material including nitrogen, said first and second metallic magnetic films being in contact with surfaces of said first and second core halves which respectively face said magnetic gap;

first and second protective film means in contact with said first and second metallic magnetic films to prevent said nitrogen of said at least one metallic magnetic film from being discharged;

at least one non-magnetic spacer film in contact with at least one of said first and second protective films so that, when said first and second core halves are abutted against each other, said first and second metallic magnetic films are opposed to each other with said first and second protective films and said non-magnetic film being interposed therebetween; and a bonding glass provided in said winding channel of said first core half for connecting said abutting first and second core halves, said bonding glass remaining free from bubbles due to said protective film means being located between said metallic magnetic films and said bonding glass.

8. A magnetic head as claimed in claim 7, further comprising a film provided between one of said metallic magnetic films and said bonding glass so as to prevent said metallic magnetic film from directly coming into contact with said bonding glass.

9. A magnetic head as claimed in claim 7, wherein each of said metallic magnetic films is made of an Fe-metal-N based alloy having a metal which is at least one of metallic elements belonging to a IVa group, Va group or VIa group in the periodic table.

10. A magnetic head as claimed in claim 9, wherein said metal of said Fe-metal-N based alloy is at least one selected from Nb, Zr, Ti, Ta, Hf, W and Mo.

11. A magnetic head as claimed in claim 7, wherein each of said protective film means is made of a nitride material.

12. A magnetic head as claimed in claim 11, wherein said protective film means is made from at least one material selected from CrN, VN, Si3N4, BN, TaN, AlN, TiN and ZrN.

13. A magnetic head as claimed in claim 7, wherein each of said protective film means is arranged to have a thickness of 10 nm to 100 nm.

14. A magnetic head comprising:
   first and second cores having magnetic surfaces arranged opposite each other forming a gap;
   a metallic magnetic film in contact with at least one of the magnetic surfaces of said first and second cores to form a magnetic gap between said first and second cores, said metallic magnetic film including nitrogen;
   a protective film means with a nitride covering and in contact with metallic magnetic film for preventing nitrogen from escaping said magnetic film;
   a non-magnetic spacer film in contact with said protective film means in the magnetic gap; and
   a bonding glass arranged to bond said first and second cores together wherein said protective film located between said metallic magnetic film and said bonding glass restricts nitrogen from escaping from said metallic magnetic film on heat treatment thereby preventing bubbles from forming in said bonding glass.

15. A magnetic head as set forth in claim 14, wherein said metallic magnetic film is made of an Fe-metal-N based alloy having a metal which is at least one of metallic elements belonging to IVa, Va, or VIa groups in the periodic table.

16. A magnetic head as set forth in claim 15, wherein said metal of said Fe-metal-N based alloy is at least one selected from among Nb, Zr, Ti, Ta, Hf, W, and Mo.

17. A magnetic head as set forth in claim 14, wherein said protective film means is made of at least one material selected from among CrN, Vn, $Si_3N_4$, BN, TaN, AlN, TiN, and ZrN.

18. A magnetic head as set forth in claim 14, wherein said protective film means is formed to have a thickness of 10 nm to 100 nm.

19. A magnetic head as set forth in claim 14, wherein said bonding glass is formed adjacent the magnetic surfaces of said first and second cores.

* * * * *